C. C. SOMERS.
HEADLIGHT.
APPLICATION FILED FEB. 2, 1921.

1,429,113. Patented Sept. 12, 1922.

C. C. Somers, Inventor

By C. A. Snow & Co., Attorneys.

Patented Sept. 12, 1922.

1,429,113

UNITED STATES PATENT OFFICE.

CHRISTOPHER C. SOMERS, OF BEND, OREGON.

HEADLIGHT.

Application filed February 2, 1921. Serial No. 441,891.

*To all whom it may concern:*

Be it known that I, CHRISTOPHER C. SOMERS, a citizen of the United States, residing at Bend, in the county of Deschutes and State of Oregon, have invented a new and useful Headlight, of which the following is a specification.

This invention relates to headlights for automobiles, and more particularly to headlights of the dirigible type, whereby the headlights will move with the steering wheels of a motor vehicle to illuminate the path of travel of the machine.

The object of the invention is to provide a headlight of this character which may be readily and easily applied to the motor vehicle construction now in use employing the connecting rod of the vehicle as a means for transmitting motion to the lamps.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1:
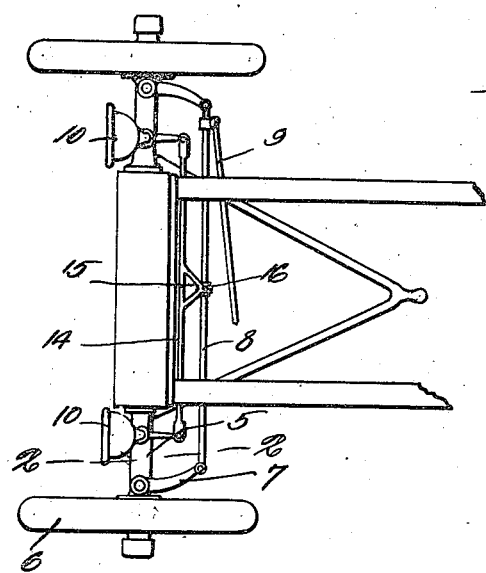
Figure 1 is a fragmental plan view of a motor vehicle chassis showing the invention as applied.
Figure 3:
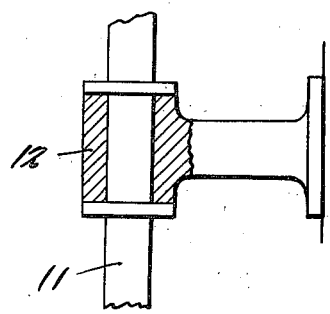
Figure 3 is an elevational view of one of the lamp brackets, the same being shown partly in section.
Figure 2:
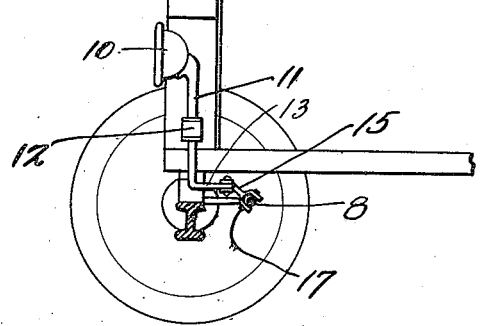
Figure 2 is a sectional view taken on line 2—2 of Figure 1.
Figure 4:
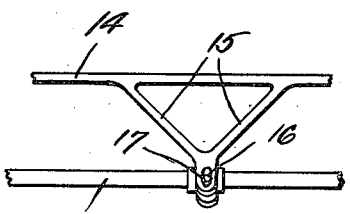
Figure 4 is a fragmental detail view disclosing the connection between the connecting rod and lamp operating rod.
Figure 5:
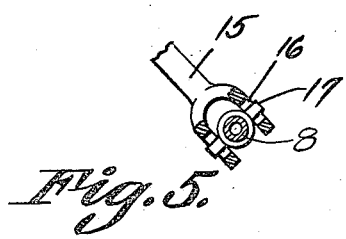
Figure 5 is a detail view of the connecting means which connects the connecting rod and operating rod.

Referring to the drawing in detail, the reference character 5 designates the front axle of the motor vehicle, which is constructed in the usual manner and provided with the usual stub axles supporting the wheels 6.

The stub axles have rearwardly extending arms 7, which are connected by means of the connecting rod 8 so that movement of the steering rod 9 results in a relative movement of the wheels.

The lamps 10 have downwardly extending arms 11 which are supported in the brackets 12 that have suitable connection with the chassis of the motor vehicle, and as shown, each of these arms has a right angled extremity 13, the right angled extremities being connected by means of the lamp operating rod 14, there being provided a pivotal connection between the lamp operating rod and the right angled portions 13.

The lamp operating rod 14 is provided with a triangular shape extension 15, which extension extends rearwardly and is provided with elongated openings 16 adapted to accommodate the pins 17 that are carried by the connecting rod 8, so that movement of the connecting rod will result in a relative movement of the lamp operating rod 14.

From the foregoing it is obvious that when the steering wheel 9 is moved to accomplish the steering of the front wheel 6, the operating rod 14 is also moved to cause the operation of the lamp arms 11 to move the lamps 10, which are supported thereby in the same direction as the steering wheels 6 are moved, to illuminate the path of travel of the machine supplied with the attachment.

What is claimed as new is:—

In combination with the connecting rod connecting the front wheels of a motor vehicle, lamp supporting brackets, lamp supporting arms mounted in the brackets for pivotal movement therein, each of said arms having a lower right angled portion, an operating rod having its ends connected with the right angled portions of the arms, a triangular shaped extension formed integral with the operating rod at a point intermediate the ends thereof, arms having openings, forming a part of the extension, a pin extending through the connecting rod and having its ends disposed within the openings whereby movement of the connecting rod produces a relative movement of the operating rod.

In testimony that I claim the foregoing as my own, I have hereto affixed my signature in the presence of two witnesses.

CHRISTOPHER C. SOMERS.

Witnesses:
G. C. MORGAN,
THOMAS DUTRUIB.